(12) United States Patent
D'Annunzio et al.

(10) Patent No.: US 12,645,667 B2
(45) Date of Patent: Jun. 2, 2026

(54) INTER-LEDGER RELATIONSHIPS

(71) Applicant: TRAENT S.R.L., Milan (IT)

(72) Inventors: Federico D'Annunzio, Florence (IT);
Fabio Severino, Pisa (IT); **Andrea
Canciani, Pisa (IT); Claudio Felicioli**,
Pisa (IT)

(73) Assignee: TRAENT S.R.L. (IT)

( * ) Notice: Subject to any disclaimer, the term of this
patent is extended or adjusted under 35
U.S.C. 154(b) by 0 days.

(21) Appl. No.: 18/869,570

(22) PCT Filed: May 29, 2023

(86) PCT No.: PCT/EP2023/064324
§ 371 (c)(1),
(2) Date: Nov. 26, 2024

(87) PCT Pub. No.: WO2023/232740
PCT Pub. Date: Dec. 7, 2023

(65) Prior Publication Data
US 2025/0355865 A1 Nov. 20, 2025

(30) Foreign Application Priority Data
May 30, 2022 (IT) ........................ 102022000011348

(51) Int. Cl.
*G06F 16/00* (2019.01)
*G06F 16/23* (2019.01)
*G06F 16/901* (2019.01)
(52) U.S. Cl.
CPC ...... *G06F 16/2379* (2019.01); *G06F 16/9024*
(2019.01)
(58) Field of Classification Search
CPC .................................................. G06F 16/9024
See application file for complete search history.

(56) References Cited

U.S. PATENT DOCUMENTS

| | | | |
|---|---|---|---|
| 10,868,674 B2 | 12/2020 | Beecham | |
| 10,880,105 B1 | 12/2020 | Li | |

(Continued)

FOREIGN PATENT DOCUMENTS

| | | |
|---|---|---|
| EP | 3849133 B1 | 7/2022 |
| WO | 2019228560 A2 | 12/2019 |

(Continued)

OTHER PUBLICATIONS

Bernabe, et al., "Privacy-Preserving Solutions for Blockchain:
Review and Challenges," XP011757453, IEEE Access, vol. 7, Oct.
28, 2019, pp. 164908-164940.

(Continued)

*Primary Examiner* — Ajith Jacob
(74) *Attorney, Agent, or Firm* — Bryan A. Santarelli;
FisherBroyles, LLP

(57) ABSTRACT

A method (502; 514; 530) is provided for managing, under
the control of a computing system, a plurality of ledgers
(Lk). Each ledger comprises a corresponding persistent
sequence of data blocks (DB), each ledger (Lk) being
participated by a corresponding set of participant nodes
(PNi) of the computing system, the method comprising:
—for at least one of said sets of participant nodes (PNi), said
at least one participant node (PNi) of said set appends (512),
to a ledger (Lk) corresponding to said set of participant
nodes (PNi), at least one data block (DB) each one com-
prising a pointer (p(k')) pointing to a different ledger (Lk');
—in response to a ledger relationship request by a request-
ing node (RE) about a selected ledger (Lk) and at least one
selected pointer (p(k')) comprised in the selected ledger
(Lk), generating (518; 534) a graph structure (GS), com-
prising a set of graph nodes each one labelled with an
identifier of a corresponding ledger (Lk), by: —adding a root
graph node labelled with an identifier of the selected ledger (Continued)

(Lk), and —performing a recursive procedure for an iterative pointer initialized to each of the selected pointers (p(k')), the recursive procedure comprising: a) adding a child graph node, labelled with an identifier of a ledger pointed by the iterative pointer, depending on a graph node of the graph structure labelled with an identifier of the ledger comprising the iterative pointer, and b) iterating the recursive procedure for the iterative pointer set to each pointer of a set of the pointers comprised in the ledger pointed by the iterative pointer; —providing (520; 536) an indication of the generated graph structure to the requesting node (RE)—providing (520; 536) to the requesting node (RE) at least one of: —pointers (p(k')) comprised in the ledgers (Lk) identified by identifiers labelling the graph nodes of the graph structure (GS), and a proof that said pointers (p(k')) have been included in data blocks (DB) of said ledgers.

12 Claims, 6 Drawing Sheets

(56)                References Cited

U.S. PATENT DOCUMENTS

| | | | |
|---|---|---|---|
| 11,791,980 B1 | 10/2023 | Kaddoura | |
| 12,184,784 B2 | 12/2024 | Mclver | |
| 2018/0101844 A1 | 4/2018 | Song | |
| 2018/0343111 A1* | 11/2018 | Chen | G06Q 20/0655 |
| 2019/0079950 A1 | 3/2019 | Ramabaja | |
| 2019/0104102 A1 | 4/2019 | Khan | |
| 2020/0175207 A1 | 6/2020 | Cheng | |
| 2020/0192335 A1 | 6/2020 | Takao | |
| 2020/0250747 A1 | 8/2020 | Padmanabhan | |
| 2020/0349123 A1 | 11/2020 | Irazabal | |
| 2020/0374105 A1 | 11/2020 | Padmanabhan | |
| 2020/0374301 A1 | 11/2020 | Manevich | |
| 2021/0258145 A1 | 8/2021 | Sardesai | |
| 2021/0377037 A1 | 12/2021 | Antonopoulos | |
| 2021/0406250 A1 | 12/2021 | Novo Diaz | |
| 2022/0182375 A1 | 6/2022 | Xu | |
| 2022/0358030 A1 | 11/2022 | Yanamala | |
| 2023/0046315 A1 | 2/2023 | Davies | |

FOREIGN PATENT DOCUMENTS

| | | | |
|---|---|---|---|
| WO | 2020041127 A1 | 2/2020 | |
| WO | 2023232733 A1 | 12/2023 | |
| WO | 2023232734 A1 | 12/2023 | |
| WO | 2023232735 A1 | 12/2023 | |
| WO | 2023232736 A1 | 12/2023 | |
| WO | 2023232738 A1 | 12/2023 | |
| WO | 2023232739 A1 | 12/2023 | |

OTHER PUBLICATIONS

De Meijer, Carlo R.W., "Blockchain Versus GDPR and Who Should Adjust Most," XP055719852, Oct. 9, 2018, Retrieved from https://www.finextra.com/blogposting/16102/blockchain-versus-gdpr-and-who-should-adjust-most; PCT International Search Report & Written Opinion mailed Aug. 24, 2023, 11 pgs.

International Search Report & Written Opinion mailed Aug. 14, 2023 for Application No. PCT/EP2023/064315, a counterpart application of U.S. Appl. No. 18/869,397, 12 pgs.

International Search Report & Written Opinion mailed Aug. 16, 2023 for Application No. PCT/EP2023/064317, a counterpart application of U.S. Appl. No. 18/869,553, 11 pgs.

International Search Report & Written Opinion mailed Aug. 18, 2023 for Application No. PCT/EP2023/064314, a counterpart application of U.S. Appl. No. 18/869,383, 8 pgs.

International Search Report & Written Opinion mailed Sep. 20, 2023 for Application No. PCT/EP2023/064324, a counterpart application of U.S. Appl. No. 18/869,570, 9 pgs.

International Search Report & Written Opinion mailed Aug. 24, 2023 for Application No. PCT/EP2023/064316, a counterpart application of U.S. Appl. No. 18/869,548, 9 pgs.

International Search Report & Written Opinion mailed Aug. 25, 2023 for Application No. PCT/EP2023/064322, a counterpart application of U.S. Appl. No. 18/869,556, 10 pgs.

International Search Report & Written Opinion mailed Aug. 30, 2023 for Application No. PCT/EP2023/064323, a counterpart application of U.S. Appl. No. 18/869,562, 11 pgs.

Politou, et al., "Blockchain Mutability: Challenges and Proposed Solutions," XP081442719, Cornell University Library, arxiv. org, IEEE, Jul. 16, 2019, pp. 1-13.

Tanner, et al., "Technology Review of Blockchain Data Privacy Solutions," XP081957719, Cornell University Library, arxiv. org, IEEE, May 4, 2021, pp. 1-60.

Non-Final Office Action mailed Feb. 13, 2026 for U.S. Appl. No. 18/869,397, a corresponding application, 16 pgs.

Non-Final Office Action mailed Mar. 16, 2026 for U.S. Appl. No. 18/869,548, a corresponding application, 12 pgs.

* cited by examiner

502

504 — append DB comprising data

510 — generate p(k')

512 — append DB comprising p(k')

514

516 — receive request

518 — generate GS (by PNi)

520 — provide GS (and additional data)

530

532 — receive request

534 — generate GS using LP

536 — provide GS (and additional data)

INTER-LEDGER RELATIONSHIPS

CROSS-REFERENCE TO RELATED APPLICATIONS

This application is a national phase filing of international application No. PCT/EP2023/064324, entitled "INTER-LEDGER RELATIONSHIPS", filed May 29, 2023 which claims the benefit of priority from Italian patent application No. 102022000011348 filed May 30, 2022, both of which are incorporated herein by reference.

BACKGROUND OF THE PRESENT INVENTION

Field of the Present Invention

The present disclosure relates to the information technology field. More specifically, the present disclosure relates to the storing of data.

Overview of the Related Art

Storing of data (e.g., logs, documents, transactions) is a commonplace activity in most computing systems (for example, for their preservation, outputting, further processing and so on).

For this reason, it is known to store data in suitable data structures, such as ledger-like data structures wherein the storing of data is persistent, i.e., data structures in which it should not be possible to remove the data thereform once they have been stored.

Distributed ledger technology (DLT) is a technology used to maintain a distributed ledger, i.e., a replicated, shared, and synchronized collection of digital records spread across multiple computer nodes (also referred to as "participant nodes" or simply "nodes") typically located across multiple sites, countries, or institutions.

A conventional distributed ledger stores data into a sequence of data blocks in chronological order, linked to each other via corresponding hash values. Particularly, a generic data block of the sequence stores the hash value of the preceding data block in the sequence.

The ledger is distributed throughout the participant nodes, which validate its content according to a consensus schema. In a consensus schema based on a proof of work, a complex mathematical problem has to be solved by determining a nonce to be added to each block that provides a specific property of its hash value.

Therefore, no data block may be altered without re-determining the nonces of this block and all the next data blocks in the ledger; however, the difficulty of the mathematical problem required to determine the nonces makes substantially impossible to alter the distributed ledger (unless a majority of the processing power of the whole network is acquired).

Distributed ledger technology has been initially designed to work with financial data, and the typical data block design is essentially a container for a list of small financial transactions.

More recently, distributed ledger technology is used in fields different than financial field (such as the internet of things, supply chains of various commodities, sharing of secure data, and logistic monitoring), and has great potential to revolutionize the way organizations operate in many industry verticals.

According to the Applicant, a very interesting field to which distributed ledger technology may find application is supply chain of goods/services, and particularly supply chain traceability, i.e., the process of tracking the provenance and journey of good/services and their inputs, from the very start of the supply chain through to end-use. Indeed, with the rise in the 'ethical economy' and the changing consumer behaviors, consumers are increasingly concerned about the ethics of their choices and product provenance. As such, consumers may want to know about aspects or topics of the supply chain through which a product was purchased or is intended to be purchased.

An example of aspect or topic of the supply chain for which traceability of products is increasingly desired, is supply chain sustainability, i.e., the environmental and human impact of products through the supply chain, from raw materials sourcing to production, storage, delivery and transportation link(s) in between. For instance, consumers may want to know if the production of products harms the environment, and/or if it is based on child labor, and/or if it causes harm to individuals in developing countries, and/or if it endangers plant or animal species.

Another example of aspect or topic of the supply chain for which traceability of products is increasingly desired, is supply chain product provenance or quality added value. For instance, consumers may want to know if a food product has been obtained from non-GMO and/or GMO-free seeds.

WO 2020/041127 discloses systems and methods for interlinking multiple independent and separately-scalable blockchains to provide transactional provenance.

The systems and methods leverage a combination of blockchain and graph data structures to interoperate between blockchains without requiring a single data structure while still providing a single chain of custody and provenance for a particular set of actions.

SUMMARY OF THE PRESENT INVENTION

Currently, there are no efficient solutions for implementing supply chain traceability, due to concerns over data privacy, and difficulties of managing inter-actor cooperation in the supply chain.

Applicant has therefore devised a solution for efficiently implementing supply chain traceability overcoming the abovementioned drawbacks.

One or more aspects of the present invention are set out in the independent claims, with advantageous features of the same invention that are indicated in the dependent claims, whose wording is enclosed herein verbatim by reference (with any advantageous feature being provided with reference to a specific aspect of the present that applies mutatis mutandis to any other aspect thereof).

In general terms, the solutions according to embodiments of the present invention are based on the idea of setting up relationships among different ledgers using pointers stored in the ledgers.

Particularly, an aspect of the present invention relates to a method for managing, under the control of a computing system, a plurality of ledgers.

Each ledger comprises a corresponding persistent sequence of data blocks.

Each ledger is participated by a corresponding set of participant nodes of the computing system.

The method comprises, for at least one of said sets of participant nodes, said at least one participant node of said set appends, to a ledger corresponding to said set of participant nodes, at least one data block each one comprising a pointer pointing to a different ledger.

The method comprises, in response to a ledger relationship request by a requesting node about a selected ledger and at least one selected pointer comprised in the selected ledger, generating a graph structure.

Said graph structure comprises a set of graph nodes each one labelled with an identifier of a corresponding ledger.

Said generating the graph structure comprises adding a root graph node labelled with an identifier of the selected ledger.

Said generating the graph structure comprises performing a recursive procedure for an iterative pointer initialized to each of the selected pointers.

The recursive procedure comprises:
a) adding a child graph node, labelled with an identifier of a ledger pointed by the iterative pointer, depending on a graph node of the graph structure labelled with an identifier of the ledger comprising the iterative pointer, and
b) iterating the recursive procedure for the iterative pointer set to each pointer of a set of the pointers comprised in the ledger pointed by the iterative pointer;

The method comprises providing an indication of the generated graph structure to the requesting node.

In this way, by including pointers in the ledgers, it is advantageously possible to set up relationship links among different ledgers, so as to provide a picture of the interrelationships among the participant nodes and the data stored in the ledgers participated by the participant nodes. This is particularly useful in case the participant nodes correspond to respective actors of a supply chain. Indeed, the pointers can be advantageously exploited to generate graph structures depicting selected relationship links among selected ledgers (or portions thereof). These graph structures may be requested by a requesting node interested in having a picture of selected interrelationships among the participant nodes that are actors of a supply chain (or of a portion thereof). In this way, the requesting node is advantageously allowed to verify the provenance of materials/components/products/services involved in the supply chain. Advantageously, since the pointers used for the generation of the graph structure are stored in data blocks of ledgers, said pointers—and therefore said graph structure—are immutable.

The method further comprises providing to the requesting node at least one of:
pointers comprised in the ledgers identified by identifiers labelling the graph nodes of the graph structure, and a proof that said pointers have been included in data blocks of said ledgers identified by identifiers labelling the graph nodes of the graph structure, and
at least one data block of at least one of the ledgers identified by identifiers labelling the graph nodes of the graph structure, and a proof that said data blocks have been actually appended to said at least one of the ledgers identified by identifiers labelling the graph nodes of the graph structure.

By providing the pointers to the requesting node, the latter may advantageously verify the reliability of the interrelationships among the participant nodes retrieved through the obtained graph structure.

By receiving selected data blocks, the requesting node may advantageously verify selected information details about the materials/components/products/services involved in the supply chain. The corresponding received proof may be advantageously used by the requesting node for verifying the reliability of the received information details.

According to an embodiment of the present invention, said graph structure is generated by at least a subset of participant nodes comprising participant nodes having access to at least one among the ledgers identified by identifiers labelling the graph nodes of the graph structure.

According to an embodiment of the present invention, said graph structure is generated by a central entity having a list of identifiers of the pointers comprised in the ledgers participated by the participant nodes.

According to an embodiment of the present invention, each one of at least one of said pointers points to one or more data blocks of a corresponding ledger.

According to an embodiment of the present invention, one or more of the ledgers identified by identifiers labelling the graph nodes of the graph structure have one or more data blocks each comprising a corresponding target data, the method further comprising the requesting node requests said target data, said at least one data block provided to the requesting node comprising said one or more data blocks comprising the corresponding target data.

In this way, the requesting node may advantageously obtain desired data about the supply chain.

According to an embodiment of the present invention, said at least one data block provided to the requesting node consists of said one or more data blocks comprising the corresponding target data.

In this way, the requesting node is provided with only the desired data and not with other data stored in the ledgers that may be subjected to confidentiality restrictions.

According to an embodiment of the present invention, at least one of the ledgers corresponding to a set of participant nodes is distributed among the participant nodes of said set of participant nodes, so that each participant node of the set of participant nodes locally stores said at least one of the ledger distributed among the participant nodes of said set.

According to an embodiment of the present invention, said ledgers are private ledgers.

According to an embodiment of the present invention, said participant node appending, to a ledger corresponding to said set of participant nodes, at least one data block, further comprises signing said at least one data block with a key connected to the identity of said participant node.

In this way, the pointers stored in the data blocks of the ledgers, and therefore the corresponding graph structures that can be obtained through said pointers, cannot be repudiated.

According to an embodiment of the present invention, each pointer pointing to a ledger is at least one among:
an identifier of a consortium managing said ledger;
an identifier of the ledger;
an identifier of one or more data blocks of said ledger;
a cryptographic digest of a specific version of said ledger.

Another aspect of the present invention provides for a computer program configured for causing a computing system to perform the method when the computer program is executed on the computing system.

A further aspect of the present invention provides a corresponding computer program product comprising one or more readable storage media having program instructions collectively stored on the readable storage media, the program instructions being readable by a computing system to cause the computing system to perform the method above.

Another aspect of the present invention provides for a computer program product comprising one or more readable storage media having program instructions collectively stored on the readable storage media, the program instructions being readable by a computing system to cause the computing system to perform the method above.

A further aspect of the present invention provides one or more computing systems comprising means configured for performing the method above.

A further aspect of the present invention provides one or more computing systems comprising circuitries for performing each step of the method above.

BRIEF DESCRIPTION OF THE DRAWINGS

These and other features and advantages of the present invention will appear more clearly by reading the following detailed description of exemplary and non-limitative embodiments thereof. For its better intelligibility, the following description should be read making reference to the attached drawing, wherein.

DETAILED DESCRIPTION OF EXEMPLARY AND NON-LIMITATIVE EMBODIMENTS OF THE PRESENT INVENTION

FIGS. 1A-1D show general principles of solutions according to embodiments of the present invention.

According to an embodiment, the solutions according to the embodiments of the invention are implemented by (or under the control of) a computing system, i.e., a system comprising a plurality of apparatuses having processing capabilities.

By making reference to FIG. 1A, a plurality of nodes (hereinafter, participant nodes) PNi of the computing system participate to (i.e., join) ledgers Lk.

Without losing generality, the participant nodes PNi belong to/identify/represent respective companies or organizations.

According to an embodiment of the present invention, each ledger Lk is participated by a corresponding set Sk of participant nodes PNi. In the non-limitative example of FIG. 1A, in which six participant nodes PN0, PN1, . . . , PN5 and five ledgers L01, L12, L32, L24, L25 are provided:

a set S01 of participant nodes comprising the participant nodes PN0 and PN1 participates to the ledger L01;

a set S12 of participant nodes comprising the participant nodes PN1 and PN2 participates to the ledger L12;

a set S32 of participant nodes comprising the participant nodes PN3 and PN2 participates to the ledger L32;

a set S24 of participant nodes comprising the participant nodes PN2 and PN4 participates to the ledger L24;

a set S25 of participant nodes comprising the participant nodes PN2 and PN5 participates to the ledger L25.

Figure 1A:
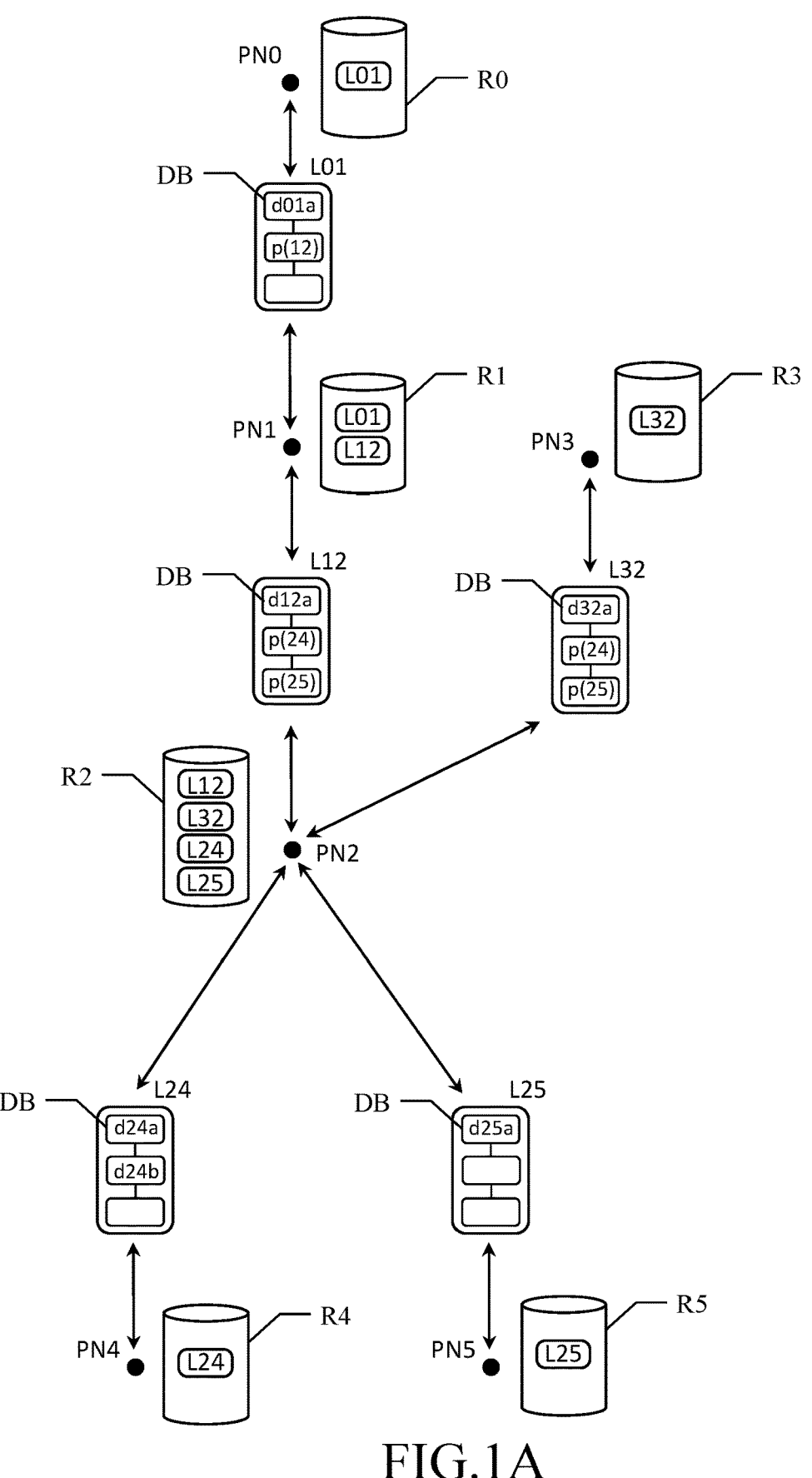
FIGS. 1A-1D show general principles of solutions according to embodiments of the present invention.

It is pointed out that although in the example illustrated in FIG. 1A all the sets Sk of participant nodes PNi comprise each only two participant nodes PNi, the concepts of the present invention can be directly applied to cases in which a set Sk comprises a different number of participant nodes PNi.

According to an embodiment of the invention, each ledger Lk comprises a corresponding persistent sequence of data blocks DB. According to an embodiment of the invention, the data blocks DB are arranged in the ledger Lk in a (chronological) sequence defined by their appending to the ledger Lk carried out by a participant node PNi of the corresponding set Sk. For this purpose, the data blocks DB may only be added in sequence by appending them to an end of the ledger Lk. Therefore, the ledger Lk accumulates the blocks that are never removed from the ledger Lk once they have been added therein (with any updates of the data that preserve all previous versions of the same data block DB).

According to an embodiment of the present invention, each ledger Lk is a private ledger participated by the participant nodes PNi of the corresponding set Sk, so that the nodes of said set Sk form (belong to) a corresponding private network. For example, the ledger Lk is a ledger with access permissions restricted to the nodes of the computing system allowed to participate to the ledger Lk (such as the participant nodes PNi of the corresponding set Sk). The concepts of the present invention can be also applied to the case in which (at least a subset of) the ledgers Lk are public ledgers participated on one or more public networks.

According to an embodiment of the invention, each one of at least a set of the ledgers Lk is a private ledger comprising a private distributed ledger, i.e., a data structure in which each participant node PNi (i.e., the participant nodes PNi of the corresponding set Sk) maintains and updates a respective copy of the ledger Lk, or ledger copy (which results in eventually consistent ledger copies across the participant nodes of the set Sk). According to an embodiment of the invention, each participant node PNi stores the respective copy of the ledger Lk in a respective repository Ri. Without losing generality, the repository Ri of each participant node PNi may be physically located or reside at that participant node PNi or may be physically located or reside remotely with respect to that participant node PNi.

According to an embodiment of the present invention, nodes of the computing system may be allowed to participate to a ledger Lk (i.e., to become a participant node PNi included in the corresponding set Sk) based on a private agreement, and/or by permission from a manager of the ledger Lk.

According to an embodiment of the present invention, the consistency of the history of a ledger Lk (hereinafter, ledger history), for example the absence of forks, may be evaluated by one or more certification entities (not illustrated) that may act as a generally trusted authority being trusted by (e.g., by convention among) the participant nodes PNi of the corresponding set Sk.

Without losing generality, according to an embodiment of the present invention, the participant nodes PNi of a same set Sk belong to/identify/represent respective companies or organizations that are in a partnership relationship to each other, being for example in commercial or business partnership relationship to each other.

Without losing generality, according to an embodiment of the present invention, the participant nodes PNi correspond to respective actors or players of a supply chain, such as providers of services, suppliers of raw materials, manufacturers of respective finished products or semi-finished products, or distributors of finished products on a market.

As a non-limitative example:

the participant node PN0 may correspond to a distributor of a device D1 on a specific market;

the participant node PN1 may correspond to a manufacturer of the device D1 using components C;

the participant node PN2 may correspond to a producer of the component C using raw materials M1 and M2;

the participant node PN3 may correspond to a manufacturer of a device D2 using the components C;

the participant node PN4 may correspond to a supplier of the raw material M1;

the participant node PN5 may correspond to a supplier of the raw material M2.

According to an embodiment of the present invention, within each set Sk, the participant nodes PNi thereof share data to each other by appending data blocks DB to the corresponding ledger Lk including said data.

According to an embodiment of the invention, a data block DB appended to the corresponding ledger Lk by a participant node PNi of the set Sk is digitally signed by said participant node PNi using a digital key connected to the identity of said participant node PNi, such as for example exploiting a Public Key Infrastructure (PKI) recognized by the participant nodes PNi of the set Sk.

In a practical implementation, the data included in the appended blocks DB may comprise data relating to a topic.

According to an embodiment of the invention, the data may comprise (but is not limited to) one or more among logs, documents, transactions, certifications and chats relating to the topic.

Examples of topics include, but are not limited to, provenance of supply chain products/components/raw materials/services, environmental sustainability of the supply chain materials, environmental/working sustainability of the manufacturing process of supply chain products/components, and so on.

As a non-limitative example:

a data block DB of the ledger L01 may comprise data d01a corresponding to a supply contract stipulated between the company corresponding to the participant node PN0 and the company corresponding to the participant node PN1 in which it is declared that the device D1 is provided by the company corresponding to the participant node PN1 to the company corresponding to the participant node PN0;

a data block DB of the ledger L12 may comprise data d12a corresponding to a supply contract stipulated between the company corresponding to the participant node PN1 and the company corresponding to the participant node PN2 in which it is declared that the component C is provided by the company corresponding to the participant node PN2 to the company corresponding to the participant node PN1;

a data block DB of the ledger L32 may comprise data d32a corresponding to a supply contract stipulated between the company corresponding to the participant node PN3 and the company corresponding to the participant node PN2 in which it is declared that the component C is provided by the company corresponding to the participant node PN2 to the company corresponding to the participant node PN3;

a data block DB of the ledger L24 may comprise data d24a corresponding to a supply contract stipulated between the company corresponding to the participant node PN4 and the company corresponding to the participant node PN2 in which it is declared that the raw material M1 is provided by the company corresponding to the participant node PN4 to the company corresponding to the participant node PN2;

a data block DB of the ledger L24 may comprise data d24b corresponding to an environmental certification about the impact on the environment caused by the extraction of the raw material M1 provided by the company corresponding to the participant node PN4;

a data block DB of the ledger L25 may comprise data d25a corresponding to a supply contract stipulated between the company corresponding to the participant node PN5 and the company corresponding to the participant node PN2 in which it is declared that the raw material M2 is provided by the company corresponding to the participant node PN5 to the company corresponding to the participant node PN2.

According to an embodiment of the present invention, a participant node PNi of a set Sk may (sign and) append to the corresponding ledger Lk a data block DB including a pointer p(k') pointing to another ledger Lk' different from the ledger Lk, so as to set up a link between the ledger Lk (pointing ledger) and the ledger Lk' (pointed ledger).

According to an embodiment of the present invention, the data block DB comprising a pointer p(k') pointing to ledger Lk' is appended by a participant node PNi that has a knowledge of the pointed ledger Lk'. As a not-limitative example, this participant node PNi may be a participant node PNi of both the pointing ledger Lk and the pointed ledger Lk', i.e., a participant node belonging to both the set Sk corresponding to the pointing ledger Lk and the set Sk' corresponding to the pointed ledger Lk'.

According to an embodiment of the present invention, a ledger Lk may comprise two or more data blocks DB each one storing a pointer p(k'), p(k''), p(k'''), . . . , pointing to a different ledger Lk', Lk'', Lk''', . . . , so as to set up a link between the ledger Lk and a plurality of different pointed ledgers Lk', Lk'', Lk''', . . . . Similar considerations apply if two or more different pointers p(k'), p(k''), p(k'''), . . . are stored in a same data block DB.

According to an embodiment of the present invention, the pointer p(k') may comprise an identifier of the pointed ledger Lk', such as for example an identifier of a consortium managing said pointed ledger Lk'. Additionally, according to an embodiment of the invention, said identifier of a ledger consortium may be also provided with a specific identifier of the ledger if the consortium manages more than one ledger. Other solutions may be envisaged, such as for example based on a cryptographic digest of a specific version of the ledger (e.g., a Merkle tree root).

According to an embodiment of the present invention, a pointer p(k') may also specifically point to a selected set of (one or more) data blocks DB of the pointed ledger Lk'. In this case, the pointer p(k') may (also) comprise an identifier of such set of data blocks DB, such as for example a hash thereof.

Thanks to the presence of the pointers p(k') according to the present invention, relationship links among different ledgers Lk can be set up, so as to provide a picture of the interrelationships among the participant nodes PNi and the data stored in the ledgers Lk participated by the participant nodes PNi. This is particularly useful in case of the participant nodes PNi belong to/identify/represent respective companies or organizations that are actors of a supply chain.

By making reference again to the example illustrated in FIG. 1A:

the participant node PN1 appended to the ledger L01 a data block DB comprising a pointer p(12) pointing to the ledger L12, so as to set up a link between the participant node PN2 that provided the component C and the participant node PN1 that used said component C to manufacture the device D1;

the participant node PN2 appended to the ledger L12 a data block DB comprising a pointer p(24) pointing to the ledger L24, so as to set up a link between the participant node PN4 that provided the raw material M1 and the participant node PN2 that used said raw material M1 to manufacture the component C;

the participant node PN2 appended to the ledger L12 a data block DB comprising a pointer p(25) pointing to the ledger L25, so as to set up a link between the participant node PN5 that provided the raw material M2 and the participant node PN2 that used said raw material M2 to manufacture the component C;

the participant node PN2 appended to the ledger L32 a data block DB comprising a pointer p(24) pointing to the ledger L24, so as to set up a link between the participant node PN4 that provided the raw material M1 and the participant node PN2 that used said raw material M1 to manufacture the component C;

the participant node PN2 appended to the ledger L32 a data block DB comprising a pointer p(25) pointing to the ledger L25, so as to set up a link between the participant node PN5 that provided the raw material M2 and the participant node PN2 that used said raw material M2 to manufacture the component C.

As already mentioned above, instead of providing pointers pointing to a whole ledger, pointers to one or more data blocks thereof may be provided. For example, the participant node PN1 may append to the ledger L01 a data block DB comprising a pointer p(12) to the data block DB of the ledger L12 that comprises the data d12a specifying the supply contract in which it is declared that the component C is provided by the company corresponding to the participant node PN2 to the company corresponding to the participant node PN1.

According to an embodiment of the present invention, the pointers p(k') may be advantageously exploited to generate graph structures GS depicting selected relationship links among selected ledgers Lk (or portions thereof). These graph structures GS may be requested by entities (or nodes) interested in having a picture of selected interrelationships among the participant nodes PNi that are actors of a supply chain (or of a portion thereof), so as to be able to verify the provenance of materials/components/products/services involved in the supply chain, as well as selected details about them.

According to an embodiment of the present invention, a graph structure GS may provide an indication of ledgers Lk' that are (directly and indirectly) linked to a selected ledger Lk through selected pointers p (k').

According to an embodiment of the present invention, the graph structure GS comprises one more graph nodes, each one corresponding to a respective ledger.

According to an embodiment of the present invention, a graph structure GS corresponding to a selected ledger Lk and at least one selected pointer p(k') may provide for:

generating a root graph node RGN of the graph structure GS labelled with an identifier of the selected ledger, and performing a recursive procedure for an iterative pointer initialized to each of the selected pointers, the recursive procedure comprising:

a) adding a child graph node CGN, labelled with an identifier of a ledger pointed by the iterative pointer, depending on a graph node of the graph structure labelled with an identifier of the ledger comprising the iterative pointer, and b) iterating the recursive procedure for the iterative pointer set to each pointer of a set of the pointers comprised in the ledger pointed by the iterative pointer.

According to an embodiment of the present invention, the graph structure GS is generated by at least a subset of the participant nodes PNi—comprising participant nodes PNi each one having access to at least one of the ledgers Lk listed in the graph structure GS—which communicate to each other for reconstructing the relationship links among the ledgers Lk exploiting the pointers p(k').

According to another embodiment of the present invention, the graph structure GS is generated by a central entity (or node) having a knowledge of the ledgers locally stored in the repositories Ri of the participant nodes PNi. For this purpose, according to an embodiment of the present invention, the central entity has a list LP of (identifiers of) the pointers p(k') stored in the ledgers stored in the repositories Ri of the participant nodes PNi.

It is pointed out that since the pointers p(k') used for the generation of the graph structure GS are stored in data blocks DB of ledgers Lk, said pointers p(k') are immutable.

Moreover, since a data block DB of a ledger Lk storing a pointer p(k') is signed by the participant node PNi having appended said data block DB to the ledger Lk, such pointer p(k') cannot be repudiated.

Since the pointers p(k') used for the generation of the graph structures GS are immutable and cannot be repudiated, it is advantageously possible to generate proofs and/or data to be used for cryptographically demonstrating that a specific graph structure GS is consistent with the pointers p(k') specifically used for the generation thereof. According to an embodiment of the present invention, such proofs and/or data may be provided to the requesting entity that requested the graph structure GS together with (e.g., attached to) the latter. Possible examples of said proofs and/or data may comprise:

the ledgers Lk mentioned in the graph structure GS (in this way, the requesting entity is able to fully verify the consistency of the graph structure GS with the pointers p(k') included in the mentioned ledgers Lk);

data blocks DB of the ledgers Lk mentioned in the graph structure GS that store the pointers p(k'), with corresponding inclusion proofs relating to said ledgers Lk (in this case, the requesting entity is not able to verify that all the pointers p(k') comprised in a ledger Lk have been used to generate the graph structure GS, but said entity is at least able to verify that the pointers p(k') included in the received data blocks DB are not repudiable and have been actually used to generate the graph structure GS);

the pointers p(k') themselves, with proofs that said pointers p(k') have been included in data blocks DB of ledgers Lk mentioned in the graph structure GS (however, in this case the requesting entity is not able to verify that all the pointers p(k') included in said data blocks DB have been used to generate the graph structure GS).

According to an embodiment of the present invention, if the entity requesting the graph structure GS has a limited access right, meaning that said entity may have access only to a subset of the ledgers Lk involved in a supply chain and/or to a subset of the data blocks DB thereof, the graph structure GS is generated by taking into account only said reduced subset of ledgers Lk and/or data blocks DB.

According to an embodiment of the present invention, the generated graph structure GS may have a predefined depth, for example set by the entity requesting the graph structure GS.

Figure 1B:
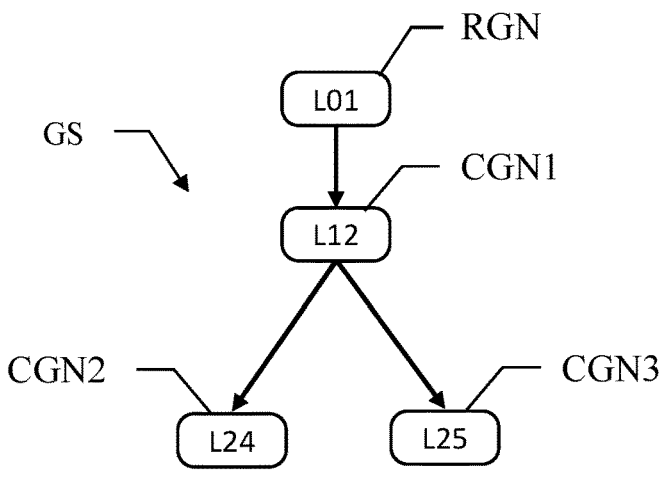

FIG. 1B illustrate a first exemplary graph structure GS, identified with reference GS, generated in response to a ledger relationship request about the ledger L01.

A root graph node RGN is generated labelled with an identifier of the ledger L01.

Since the ledger L01 comprises a pointer p(12) to the ledger L12, a child graph node CGN1 is added, depending on the root graph node RGN and labelled with an identifier of the ledger L12.

Since the ledger L12 comprises a pointer p(24) to the ledger L24, a child graph node CGN2 is added, depending on the child graph node CGN1 and labelled with an identifier of the ledger L24.

Since the ledger L12 further comprises a pointer p(25) to the ledger L25, a child graph node CGN3 is added, depending on the child graph node CGN1 and labelled with an identifier of the ledger L25.

The graph structure GS may be exploited by the requester of the ledger relationship request to obtain a general picture of the various actors in the supply chain of the device D1 that is being distributed on the market by PN0 as well as about the provenance of materials/components/products/services involved in the supply chain.

Figure 1C:
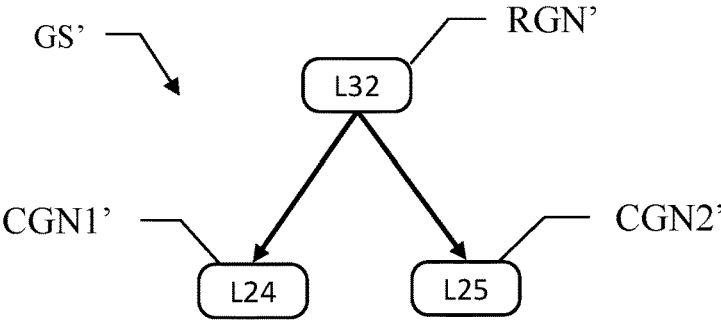

FIG. 1C illustrate a second exemplary graph structure GS, identified with reference GS', generated in response to a ledger relationship request about the ledger L32.

A root graph node RGN' is generated labelled with an identifier of the ledger L32.

Since the ledger L32 comprises a pointer p(24) to the ledger L24, a child graph node CGN1' is added, depending on the root graph node RGN' and labelled with an identifier of the ledger L24.

Since the ledger L32 further comprises a pointer p(25) to the ledger L25, a child graph node CGN2' is added, depending on the root graph node RGN' and labelled with an identifier of the ledger L25.

The graph structure GS' may be exploited by the requester of the ledger relationship request to obtain a general picture of the various actors in the supply chain of the device D2 well as as about the provenance of materials/components/products/services involved in the supply chain.

Figure 1D:
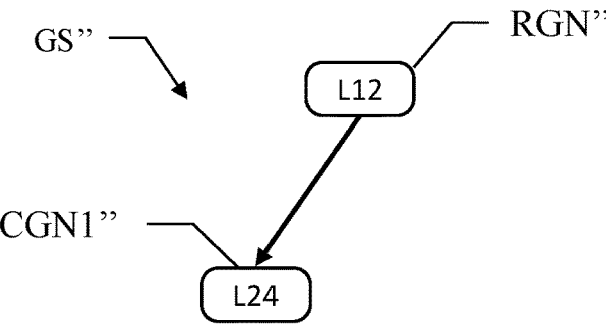

FIG. 1D illustrate a third exemplary graph structure GS, identified with reference GS", generated in response to a ledger relationship request about the ledger L12 and the pointer p(24) comprised in the ledger L12.

A root graph node RGN" is generated labelled with an identifier of the ledger L12, and a single child graph node CGN1" is added, depending on the root graph node RGN" and labelled with an identifier of the ledger L24.

The graph structure GS" may be exploited by the requester of the ledger relationship request to obtain information of the various actors in the supply chain of the device D2 involved in the raw material M1 used to manufacture the component C.

As already mentioned above, according to an embodiment of the present invention, in response to a ledger relationship request by a requesting entity, further data may be provided to the requesting entity—in addition to the generated graph structure GS—to be used for verifying consistency of the graph structure GS with the pointers p(k') specifically used for the generation thereof.

According to an embodiment of the present invention, such further data may comprise selected pointers p(k') among the pointers p(k') comprised in ledgers Lk listed in the graph structure GS. According to an embodiment of the present invention, each of said selected pointers p(k') is provided with a corresponding proof that said pointer p(k') is actually comprised in a data block DB of one of the ledgers Lk listed in the graph structure GS. For example, according to a non-limitative embodiment of the present invention, said proof is an inclusion proof, such as a Merkle inclusion proof relating to the data included in the data block DB comprising the pointer p(k').

According to an embodiment of the present invention, such further data may comprise selected ledgers Lk among the ledgers Lk listed in the graph structure GS and/or selected data blocks DB thereof. According to an embodiment of the present invention, each of said selected data blocks DB is provided with a corresponding proof that said data block DB is actually a data block DB of one of the ledgers Lk listed in the graph structure GS. For example, according to a non-limitative embodiment of the present invention, said proof is an inclusion proof, such as a Merkle inclusion proof.

The possibility of providing the requesting entity with (a content of) selected data blocks DB of one or more of the ledgers Lk listed in the graph structure GS may be expediently used to allow the requesting entity to obtain desired target data for verifying specific details about some aspects of the supply chain wherein the participant nodes PNi are involved.

For example, by making reference to the exemplary supply chain scenario illustrated in FIG. 1A, in which the ledger L24 has a data block DB comprising data d24b corresponding to an environmental certification about the impact on the environment caused by the extraction of the raw material M1 (provided by the company corresponding to the participant node PN4), an entity interested to verify the impact on the environment of the device D1 may request, in addition to a graph structure GS relating to the supply chain (and possibly the involved pointers p(k') together with the corresponding inclusion proofs), any environmental certification stored in data blocks DB of the ledgers Lk listed in the graph structure GS (possibly, together with the corresponding inclusion proofs). In the example at issue, the requesting entity will be provided with the data block DB comprising the data d24b corresponding to the environmental certification about the raw material M1.

According to an embodiment of the present invention, in order to balance confidentiality and auditability, a requesting entity having carried out a ledger relationship request is provided with only the (content of the) data block(s) DB that are not subjected to confidentiality restrictions for the requesting entity. By making reference to the previously mentioned example of FIG. 1A, the only data block DB the requesting entity is able to obtain may be the one comprising the data d24b corresponding to the environmental certification about the raw material M1, while other data blocks DB, such as for example the data block DB of the ledger L12 comprising the data d12a corresponding to the supply contract stipulated between the companies corresponding to the participant nodes PN1 and PN2 may be not provided, being for example restricted to only the participant nodes PN1 and PN2.

Figure 2:
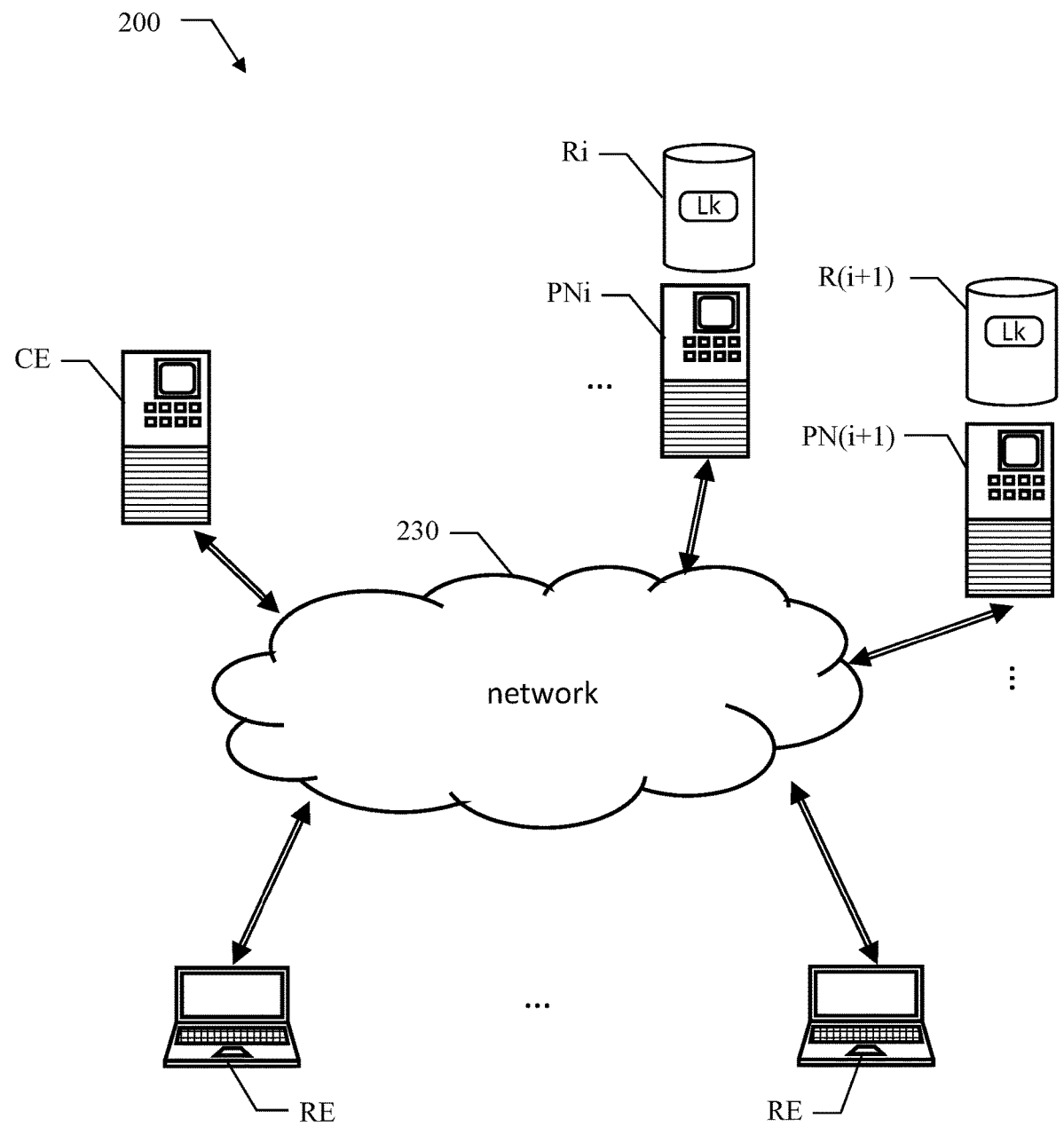
FIG. 2 is a schematic block diagram of an information technology infrastructure that may be used to implement a solution according to embodiments of the present invention.

FIG. 2 is a schematic block diagram of an information technology infrastructure 200 that may be used to implement the solution according to embodiments of the present invention.

According to an embodiment of the present invention, the infrastructure 200 comprises a plurality of participant nodes PNi participating to corresponding ledgers Lk. Each participant node PNi stores the respective copy of the ledgers Lk in a respective repository Ri.

According to an embodiment of the present invention, the infrastructure 200 further comprises one or more requesting entities (or nodes) RE configured to carry out ledger relationship requests about the ledgers Lk.

According to an embodiment of the present invention, the infrastructure 200 further comprises a central entity (or node) CE having a knowledge of the pointers p(k') comprised in the ledgers Lk stored in the repositories Ri of the participant nodes PNi. For example, a list LP of (identifiers of) said pointers p(k') may be stored at the central entity CE, together with corresponding metadata at least comprising identifiers of the ledgers Lk that include (data blocks DB storing) the pointers p(k').

The participant nodes PNi, the requesting entities RE and the central entity communicate among them over a (telecommunication) network 230, such as for example the Internet.

Figure 3:
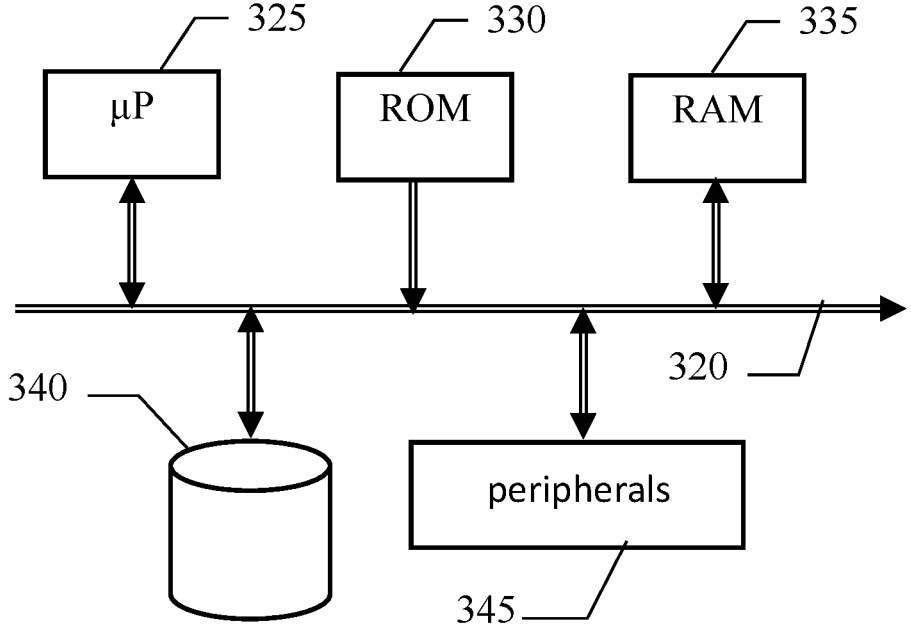
FIG. 3 shows an example of modules included in a node of the information technology infrastructure of FIG. 2.

Passing now to FIG. 3, each of the above-described computing systems (participant nodes PNi, requesting entities RE, central entity CE) comprises several units that are connected among them through a bus structure 320 at one or more levels (with an architecture that is suitably scaled according to the type of the computing system PNi, RE, CE). Particularly, a microprocessor ($\mu$P) 325, or more, provides a logic capability of the computing system PNi, RE, CE, a non-volatile memory (ROM) 330 stores basic code for a bootstrap of the computing system PNi, RE, CE and a volatile memory (RAM) 335 is used as a working memory by the microprocessor 325. The computing system PNi, RE, CE is provided with a mass-memory 340 for storing programs and data (for example, storage devices of a data center wherein each computing system PNi, CE is implemented and a Solid State Disk, or SSD, for each computing system RE). Moreover, the computing system PNi, RE, CE comprises a number of controllers for peripherals, or Input/Output (I/O) units, 345; for example, the peripherals 345 of each computing system PNi, CE comprise a network adapter for plugging the computing system PNi, CE into a corresponding data center and then connecting it to a console of the data center for its control (for example, a personal computer, also provided with a drive for reading/writing removable storage units, such as of USB type) and to a switch/router sub-system of the data center for its communication with the network 230, whereas the peripherals 345 of each computing system RE comprise a keyboard, a mouse, a monitor, a network adapter for connecting to the network 230 and a drive for reading/writing removable storage units (such as of USB type).

Figure 4:
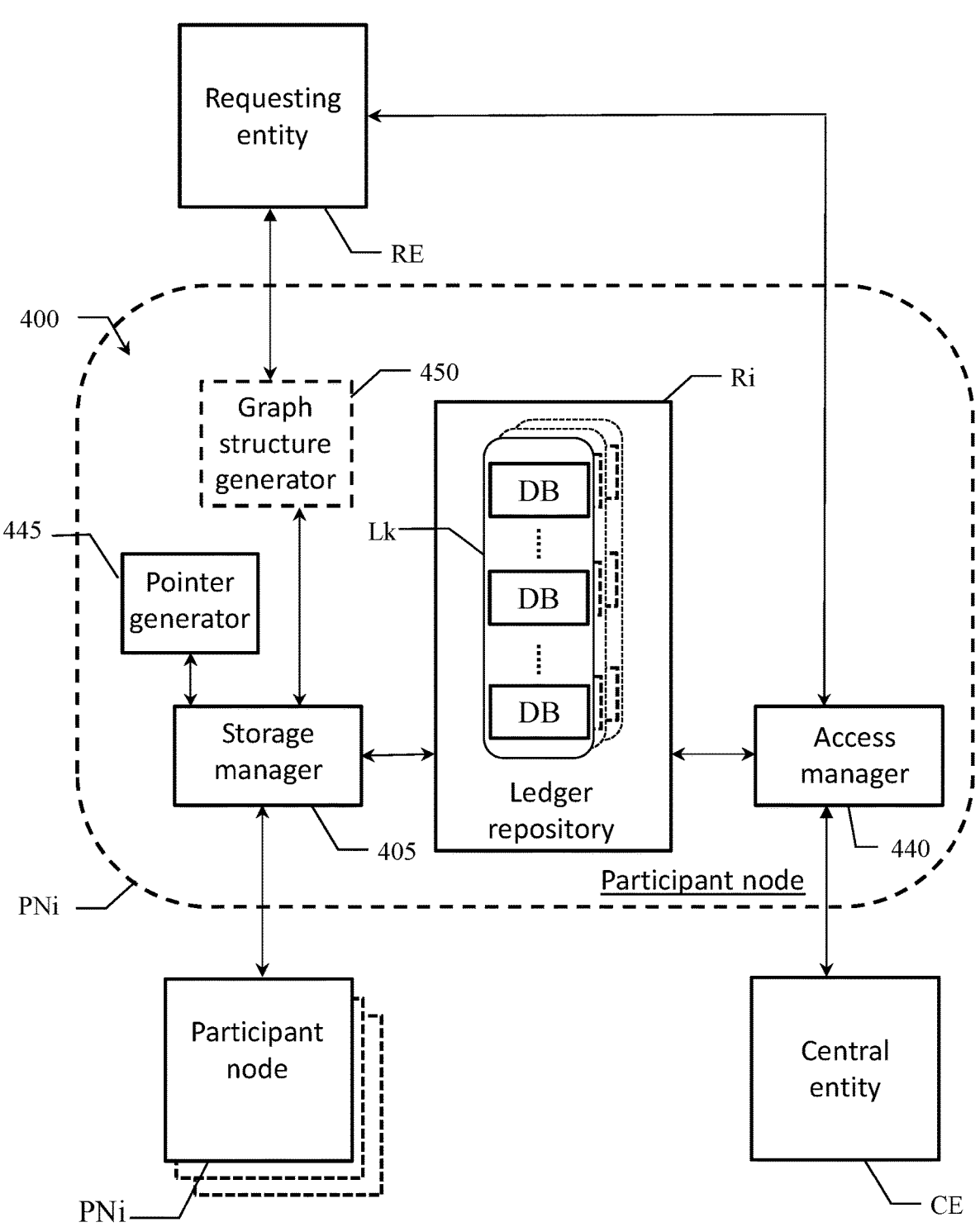
FIG. 4 shows main software components that may be used by nodes of the information technology infrastructure of FIG. 2 to implement solutions according to embodiments of the present invention.

With reference now to FIG. 4, main software components are shown that may be used by a participant node PNi belonging to one or more sets Sk of participant nodes PNi to implement the solution according to an embodiment of the present disclosure.

Particularly, all the software components (programs and data) are denoted as a whole with the reference 400. The software components are typically stored in the mass memory and loaded (at least partially) into the working memory of the participant node PNi when the programs are running, together with an operating system and other application programs not directly relevant to the solution of the present disclosure (thus omitted in the figure for the sake of simplicity). The programs are initially installed into the mass memory, for example, from removable storage units or from the network. In this respect, each program may be a module, segment or portion of code, which comprises one or more executable instructions for implementing the specified logical function.

The software components 400 comprise a storage manager 405 configured to manage the storing of data (including also the pointers p(k')) in data blocks DB of ledgers Lk corresponding to the sets Sk the participant node PNi is participating to. The storage manager 405 is configured to read/write the repository Ri of the participant node PNi under the control of the participant node PNi.

The storage manager 405 is configured to interact with other participant nodes PNi that belong to the sets Sk the participant node PNi is participating to.

An access manager 440 manages the access to selected data stored in the participant node PNi. The access manager 440 is configured to read the repository Ri and provide data extracted from selected data blocks DB of selected ledgers Lk stored in the ledger repository Ri to the requesting entities RE and/or the central entity CE.

According to an embodiment of the present invention, the software components 400 of the participant node PNi further comprises a pointer generator 445 configured to generate pointers p(k') pointing to (a set of data blocks DB of) corresponding ledgers Lk'.

According to an embodiment of the present invention, the software components 400 of the participant node PNi may further comprise a graph structure generator 450 configured to generate graph structures GS depicting selected relationship links among selected ledgers Lk (or portions thereof) by exploiting data retrieved from the repository Ri as well as from other participant nodes PNi.

According to another embodiment of the present invention, the graph structure generator 450 is not provided, the graph structures GS being instead generated by the central entity CE.

Figure 5A:
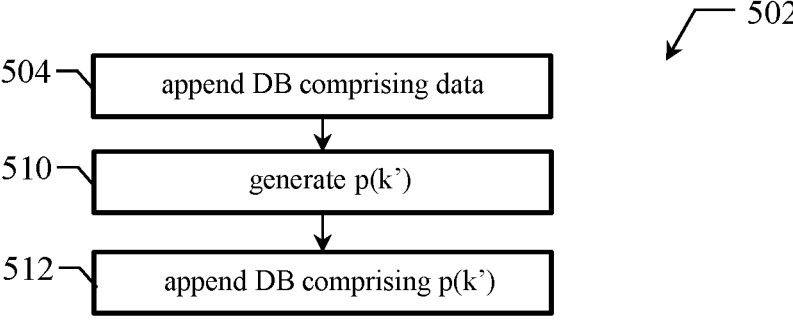
FIGS. 5A-5C depict exemplary flow charts describing examples of the operations carried out by nodes of the information technology infrastructure of FIG. 1 to implement solutions according to embodiments of the present invention.

With reference to FIG. 5A, an exemplary flow chart 502 is shown describing an example of the operations carried out by (the software components 400 of) participant nodes PNi belonging to a set Sk (and corresponding to companies being actors of a supply chain) for appending a new data block DB to the corresponding ledger Lk comprising new data, and for setting up a relationship link between the ledger Lk comprising the new data and another ledger Lk' according to an embodiment of the present invention.

The flow of operations starts when a participant node PNi of the set Sk appends (block 504) to the ledger LDk a data block DB comprising data relating to said supply chain, such as for example a supply contract stipulated between the company corresponding to the participant node PNi and a company corresponding to another participant node PNi. For this purpose, the storage manager 405 of the participant node PNi creates and sign a new data block DB comprising said data, and adds it to the ledger Lk stored in its repository Ri.

The next operation provides for having the pointer generator 445 of one of the participant nodes PNi of the set Sk generate (block 510) a pointer p(k') pointing to another ledger Lk' or to a set of selected data blocks of said another ledger Lk'.

Then, the storage manager 405 of said participant node PNi creates and sign a new data block DB comprising said pointer p(k'), and appends it to the ledger Lk stored in its repository Ri (block 512).

Figure 5B:
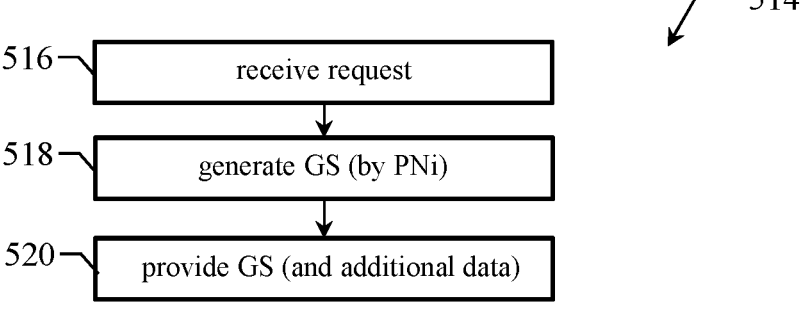

With reference to FIG. 5B, an exemplary flow chart 514 is shown describing an example of the operations carried out by (the software components 400 of) participant nodes PNi provided with the graph structure generator 450 for generating a graph structure GS about a ledger Lk in response to a ledger relationship request carried out by a requesting entity RE to one of the participant nodes PNi according to an embodiment of the present invention.

The flow of operations starts when a participant node PNi receives from a requesting entity RE a ledger relationship request pertaining to the ledger Lk (block 516).

The graph structure generator 450 of the participant node PNi having received the request accordingly generates (block 518) a graph structure GS based on the pointers p(k') stored in the ledger Lk and possibly on further pointers p(k') provided by other participant nodes PNi storing other (directly or indirectly) pointed ledgers Lk' that are not locally stored in the repository Ri of the participant node PNi having received the request.

An indication of the generated graph structure GS is then provided (block 520) to the requesting entity RE, possibly together with additional data requested by the requesting entity RE, such as for example one or more among:

(a set of) the pointers p(k') comprised in ledgers Lk listed in the graph structure GS, possibly with respective inclusion proofs;

the ledgers Lk listed in the graph structure GS, or selected data blocks DB thereof—for example storing a target data directly requested by the requesting entity RE—, possibly with respective inclusion proofs.

Figure 5C:
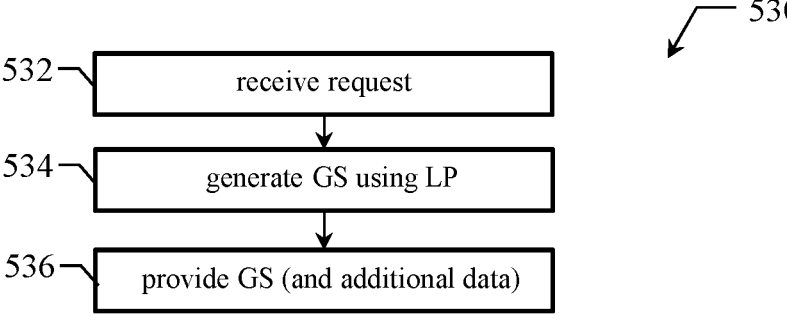

As already described above, according to an embodiment of the present invention, instead of being directly generated by the participant nodes PNi, the graph structure GS may be generated by a central entity CE having a list LP of (identifiers of) the pointers p(k') that are stored in the ledgers stored in the repositories Ri of the participant nodes PNi, as illustrated in the exemplary flow chart 530 depicted in FIG. 5C.

The flow of operations starts when the central entity CE receives from a requesting entity RE a ledger relationship request pertaining to the ledger Lk (block 532).

The central entity CE accordingly generates (block 534) a graph structure GS by exploiting the pointer list LP.

An indication of the generated graph structure GS is then provided (block 536) by the central entity CE to the requesting entity RE, possibly together with additional data requested by the requesting entity RE, such as selected pointers p(k'), ledgers Lk, and/or data blocks DB thereof, for example collected by the central entity CE from the participant nodes PNi.

Another aspect of the present invention relates to a computer program configured for causing a computing system (one or more of the participant nodes PNi and/or the central entity CE) to perform the method described above when the computer program is executed on the computing system.

Another aspect of the present invention relates to a corresponding computer program product, the computer program product comprising one or more computer readable storage media having program instructions collectively stored on the readable storage media, the program instructions readable by one or more computing systems (one or more of the participant nodes PNi and/or the central entity CE) to cause the computing system to perform the same method.

Generally, the computer program may be implemented as a stand-alone module, as a plug-in for a pre-existing software program (for example, a storage manager and a storage client, respectively, or even directly in the latter). It would be readily apparent that it is also possible to deploy the same solution as a service that is accessed through a network (such as in the Internet). Similar consideration apply if the program is structured in a different way, or if additional modules or functions are provided; likewise, the memory structures may be of other types, or may be replaced with equivalent entities (not necessarily consisting of physical storage media). The program may take any form suitable to be used by any computing system (one or more of the participant nodes PNi and/or the central entity CE), thereby configuring the computing system to perform the desired operations; particularly, the program may be in the form of external or resident software, firmware, or microcode (either in object code or in source code), for example, to be compiled or interpreted. Moreover, it is possible to provide the program on any computer readable storage medium. The storage medium is any tangible medium (different from transitory signals per se) that may retain and store instructions for use by the computing system. For example, the storage medium may be of the electronic, magnetic, optical, electromagnetic, infrared, or semiconductor type; examples of such storage medium are fixed disks (where the program may be pre-loaded), removable disks, memory keys (for example, USB), and the like. The program may be downloaded to the computing system from the storage medium or via a network (for example, the Internet, a wide area network and/or a local area network comprising transmission cables, optical fibers, wireless connections, network devices); one or more network adapters in the computing system receive the program from the network and forward it for storage into one or more storage devices of the computing system. In any case, the solution according to an embodiment of the present invention lends itself to be implemented even with a hardware structure (for example, by electronic circuits integrated on one or more chips of semiconductor material), or with a combination of software and hardware suitably programmed or otherwise configured.

An embodiment provides a storage computing system (one or more of the participant nodes PNi and/or the central entity CE) comprising a circuitry (i.e., any hardware suitably configured, for example, by software) for performing each step of the method described above. However, the storage computing system may be of any type (for example, implemented by a physical machine, a virtual machine, a cloud service and so on).

Generally, similar considerations apply if the storage computing system and the whole system has a different structure, comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

Naturally, in order to satisfy local and specific requirements, a person skilled in the art may apply to the invention described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

The invention claimed is:

1. A method for managing, under the control of a computing system, a plurality of ledgers each one comprising a corresponding persistent sequence of data blocks, each ledger being participated by a corresponding set of participant nodes of the computing system, the method comprising:

for at least one of said sets of participant nodes, said at least one participant node of said set appends, to a ledger corresponding to said set of participant nodes, at least one data block each one comprising a pointer pointing to a different ledger;

in response to a ledger relationship request by a requesting node about a selected ledger and at least one selected pointer comprised in the selected ledger, generating a graph structure, comprising a set of graph nodes each one labelled with an identifier of a corresponding ledger, by:

adding a root graph node labelled with an identifier of the selected ledger, and performing a recursive procedure for an iterative pointer initialized to each of the selected pointers, the recursive procedure comprising:

a) adding a child graph node, labelled with an identifier of a ledger pointed by the iterative pointer, depending on a graph node of the graph structure labelled with an identifier of the ledger comprising the iterative pointer, and b) iterating the recursive procedure for the iterative pointer set to each pointer of a set of the pointers comprised in the ledger pointed by the iterative pointer;

providing an indication of the generated graph structure to the requesting node, wherein the method further comprises providing to the requesting node at least one of:

pointers comprised in the ledgers identified by identifiers labelling the graph nodes of the graph structure, and a proof that said pointers have been included in data blocks of said ledgers identified by identifiers labelling the graph nodes of the graph structure, and at least one data block of at least one of the ledgers identified by identifiers labelling the graph nodes of the graph structure, and a proof that said data blocks have been actually appended to said at least one of the ledgers identified by identifiers labelling the graph nodes of the graph structure.

2. The method of claim 1, wherein said graph structure is generated by at least a subset of participant nodes comprising participant nodes having access to at least one among the ledgers identified by identifiers labelling the graph nodes of the graph structure.

3. The method of claim 1, wherein said graph structure is generated by a central entity having a list of identifiers of the pointers comprised in the ledgers participated by the participant nodes.

4. The method of claim 1, wherein each one of at least one of said pointers points to one or more data blocks of a corresponding ledger.

5. The method of claim 1, wherein one or more of the ledgers identified by identifiers labelling the graph nodes of the graph structure have one or more data blocks each comprising a corresponding target data, the method further comprising:

the requesting node requests said target data, said at least one data block provided to the requesting node comprising said one or more data blocks comprising the corresponding target data.

6. The method of claim 5, wherein said at least one data block provided to the requesting node consists of said one or more data blocks comprising the corresponding target data.

7. The method of claim 1, wherein at least one of the ledgers corresponding to a set of participant nodes is distributed among the participant nodes of said set of participant nodes, so that each participant node of the set of participant nodes locally stores said at least one of the ledger distributed among the participant nodes of said set.

8. The method of claim 1, wherein said ledgers are private ledgers.

9. The method of claim 1, wherein said participant node appending, to a ledger corresponding to said set of participant nodes, at least one data block, further comprises signing said at least one data block with a key connected to the identity of said participant node.

10. The method of claim 1, wherein each pointer pointing to a ledger is at least one among:

an identifier of a consortium managing said ledger;

an identifier of the ledger;

an identifier of one or more data blocks of said ledger;

a cryptographic digest of a specific version of said ledger.

11. A tangible, non-transitory computer program product comprising one or more readable storage media having program instructions collectively stored on the readable storage media, the program instructions being readable by a computing system to cause the computing system to perform the method of claim 1.

12. A computing system comprising a circuitry for performing each step of the method according to claim 1.

* * * * *